(12) United States Patent
Narayanaswamy et al.

(10) Patent No.: US 10,404,755 B2
(45) Date of Patent: *Sep. 3, 2019

(54) DEEP APPLICATION PROGRAMMING INTERFACE INSPECTION (DAPII) FOR CLOUD SECURITY

(71) Applicant: Netskope, Inc., Los Altos, CA (US)

(72) Inventors: Krishna Narayanaswamy, Saratoga, CA (US); Lebin Cheng, Saratoga, CA (US); Ravi Ithal, Los Altos, CA (US); Sanjay Beri, Los Altos, CA (US)

(73) Assignee: Netskope, Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/990,507

(22) Filed: May 25, 2018

(65) Prior Publication Data
US 2018/0278651 A1    Sep. 27, 2018

Related U.S. Application Data

(63) Continuation of application No. 15/213,250, filed on Jul. 18, 2016, now Pat. No. 9,998,496, which is a (Continued)

(51) Int. Cl.
*H04L 29/06* (2006.01)
*H04L 29/08* (2006.01)
*H04L 12/813* (2013.01)

(52) U.S. Cl.
CPC .............. *H04L 63/20* (2013.01); *H04L 47/20* (2013.01); *H04L 63/0272* (2013.01);
(Continued)

(58) Field of Classification Search
None
See application file for complete search history.

(56) References Cited

U.S. PATENT DOCUMENTS 6,898,636 B1 * 5/2005 Adams ................ G06F 21/6209
                                                      707/999.001
6,981,155 B1 * 12/2005 Lyle ........................ G06F 21/53
                                                      703/21
(Continued)

FOREIGN PATENT DOCUMENTS

| WO | 2006109187 A2 | 10/2006 |
| WO | 2008017008 A2 | 2/2008 |
| WO | 2009094654 A1 | 7/2009 |

OTHER PUBLICATIONS

PCT/US2014/21174—International Search Report and Written Opinion, dated Aug. 29, 2014, 13 pages.

(Continued)

*Primary Examiner* — Kaveh Abrishamkar
(74) *Attorney, Agent, or Firm* — Haynes Beffel & Wolfeld LLP; Ernest J. Beffel, Jr.

(57) ABSTRACT

A computer-implemented method for accessing a hosted service on client devices is described. The client devices include client software that uses a remotely delivered policy to redirect network requests for hosted services to a server to enforce visibility, policy and data security for network delivered services. The method can be used in conjunction with existing VPN and proxy solutions, but provides distinct additional functionality, particularly suited to corporate needs. Policies allow entities to centralize enforcement of service-specific restrictions across networks and communication channels, e.g. only certain users can download client records from a service—irrespective of the network used to access the service.

20 Claims, 9 Drawing Sheets

Related U.S. Application Data continuation of application No. 14/198,499, filed on Mar. 5, 2014, now Pat. No. 9,398,102.

(60) Provisional application No. 61/773,633, filed on Mar. 6, 2013.

(52) U.S. Cl.
CPC .......... *H04L 63/0281* (2013.01); *H04L 63/08* (2013.01); *H04L 63/1425* (2013.01); *H04L 63/168* (2013.01); *H04L 67/20* (2013.01); *H04L 67/28* (2013.01); *H04L 67/306* (2013.01)

(56) References Cited

U.S. PATENT DOCUMENTS

| | | | |
|---|---|---|---|
| 7,231,426 B1* | 6/2007 | Hall | G06Q 10/107 709/204 |
| 7,296,058 B2* | 11/2007 | Throop | G06Q 40/08 705/4 |
| 7,475,146 B2 | 1/2009 | Bazot et al. | |
| 7,536,439 B1* | 5/2009 | Jaladanki | H04L 51/28 709/206 |
| 7,587,499 B1 | 9/2009 | Haghpassand | |
| 8,280,986 B2 | 10/2012 | Deprun | |
| 8,281,372 B1* | 10/2012 | Vidal | H04L 51/12 726/5 |
| 8,549,300 B1* | 10/2013 | Kumar | H04L 9/3247 713/153 |
| 8,914,461 B2 | 12/2014 | Murai | |
| 9,069,436 B1* | 6/2015 | Fieweger | G06F 16/9535 |
| 9,270,765 B2 | 2/2016 | Narayanaswamy et al. | |
| 9,398,102 B2* | 7/2016 | Narayanaswamy | H04L 67/20 |
| 9,553,860 B2* | 1/2017 | Meyer | G06F 21/62 |
| 9,998,496 B2* | 6/2018 | Narayanaswamy | H04L 67/20 |
| 2001/0011238 A1 | 8/2001 | Eberhard et al. | |
| 2001/0054157 A1 | 12/2001 | Fukumoto | |
| 2002/0016773 A1 | 2/2002 | Ohkuma et al. | |
| 2002/0138593 A1* | 9/2002 | Novak | H04L 29/06027 709/219 |
| 2004/0122977 A1 | 6/2004 | Moran et al. | |
| 2004/0268451 A1* | 12/2004 | Robbin | G06Q 20/10 715/738 |
| 2005/0086197 A1 | 4/2005 | Boubez et al. | |
| 2005/0251856 A1 | 11/2005 | Araujo et al. | |
| 2007/0220251 A1* | 9/2007 | Rosenberg | G06Q 20/102 713/156 |
| 2007/0289006 A1 | 12/2007 | Ramachandran et al. | |
| 2008/0034418 A1* | 2/2008 | Venkatraman | H04L 63/0227 726/15 |
| 2008/0229428 A1 | 9/2008 | Camiel | |
| 2008/0301231 A1* | 12/2008 | Mehta | G06F 8/61 709/204 |
| 2009/0225762 A1* | 9/2009 | Davidson | H04L 12/4675 370/401 |
| 2010/0024008 A1 | 1/2010 | Hopen et al. | |
| 2010/0188975 A1* | 7/2010 | Raleigh | G06Q 10/06375 370/230.1 |
| 2011/0016197 A1 | 1/2011 | Shiimori et al. | |
| 2011/0154506 A1* | 6/2011 | O'Sullivan | G06F 21/6209 726/28 |
| 2011/0196914 A1 | 8/2011 | Tribbett | |
| 2011/0247045 A1 | 10/2011 | Rajagopal et al. | |
| 2012/0020307 A1* | 1/2012 | Henderson | H04W 28/16 370/329 |
| 2012/0237908 A1 | 9/2012 | Fitzgerald et al. | |
| 2013/0268677 A1* | 10/2013 | Marshall | H04L 47/70 709/226 |
| 2014/0007222 A1* | 1/2014 | Qureshi | G06F 21/10 726/16 |
| 2014/0032691 A1 | 1/2014 | Barton et al. | |
| 2014/0165148 A1* | 6/2014 | Dabbiere | G06F 21/60 726/4 |
| 2014/0165213 A1* | 6/2014 | Stuntebeck | H04L 63/10 726/29 |
| 2014/0245381 A1* | 8/2014 | Stuntebeck | H04L 63/102 726/1 |

OTHER PUBLICATIONS

U.S. Appl. No. 14/198,499—Office Action dated May 21, 2015, 19 pages.
EP 14761047.1—Extended Search Report dated Aug. 4, 2016, 7 pages.
U.S. Appl. No. 14/198,499—Response to Office Action dated May 21, 2015, filed Feb. 16, 2016, 8 pages.
U.S. Appl. No. 14/198,499—Notice of Allowance dated Mar. 22, 2016, 11 pages.
U.S. Appl. No. 14/198,508—Response to Office Action (Interview Summary) dated Jul. 31, 2015 filed Aug. 10, 2015, 9 pages.
U.S. Appl. No. 14/198,508—Office Action (Interview Summary) dated Jul. 31, 2015, 3 pages.
U.S. Appl. No. 14/198,508—Notice of Allowance dated Dec. 10, 2015, 14 pages.
PCT/US2014/21174—International Preliminary Report on Patentability, dated Sep. 8, 2015, 10 pages.
EP 14761047.1—Response to Extended Search Report dated Aug. 4, 2016 filed Feb. 28, 2017, 10 pages.
U.S. Appl. No. 15/213,250—Office Action dated Jan. 22, 2018, 25 pages.
U.S. Appl. No. 15/213,250—Response to Office Action dated Jan. 22, 2018, filed Feb. 14, 2018, 11 pages.
U.S. Appl. No. 15/213,250—Notice of Alloawnce dated Mar. 28, 2018, 9 pages.
EP 14761047.1—Notice of Allowance dated Jun. 1, 2018, 45 pages.
U.S. Appl. No. 15/990,509—First Action Interview Pilot Program Pre-Interview Communication dated Jan. 31, 2019, 12 pages.
U.S. Appl. No. 15/990,512—First Action Interview Pilot Program Pre-Interview Communication dated Jan. 31, 2019, 12 pages.
EP 18199916.0—Extended European Search Report dated Feb. 14, 2019, 8 pages.
U.S. Appl. No. 15/990,509—Response to First Action Interview Pilot Program Pre-Interview Communication dated Jan. 31, 2019, filed Mar. 12, 2019, 11 pages.

\* cited by examiner

Application Definition 900

```xml
<app name="dropbox" id="101">
  <id>
    <match op="regex" field-name="http_host" val="*.dropbox.com"/>
  </id>
  <resource-paths>
    <basepath>
      <host rootdomain="dropbox.com" />
    </basepath>
  </resource-paths>
  <vars>
    <var name="logine" type="conn" vtype="string" meta="email" />
  </vars>
  <triggers>
    <trigger name="login-successful" adminpolicy="yes" displayname="Dropbox Login Successful." />
    <trigger name="login-failed" adminpolicy="yes" displayname="Dropbox Login Failed." />
  </trigger>
  <resource path="/login">
    <request>
      <method type="POST" >
        <data type="kvps"/>
        <extract field-name="http_post_data" key="login_email" target-var="logine" />
      </method>
    </request>
    <response>
      <trigger>
        <condition>
          <or>
            <match op="eq" field-name="http_status" val="200"/>
            <match op="eq" field-name="http_status" val="302"/>
          </or>
        </condition>
        <find-and-update-user key="login_email" val="{logine}"/>
        <raise name="login-successful"/>
      </trigger>
      <trigger >
        <condition>
          <and>
            <match op="neq" field-name="http_status" val="200"/>
            <match op="neq" field-name="http_status" val="302"/>
          </and>
        </condition>
        <raise name="login-failed"/>
      </trigger>
    </response>
  </resource>
</app>
```

FIG. 9

Event log entry
1100

```
[
{
    "id":"000039",
    "srcip":"38.104.138.246",
    "src_location":"Palo Alto",
    "src_region":"CA",
    "src_country":"US",
    "src_zipcode":"94301",
    "src_latitude":37.441898,
    "src_longitude":-122.142998,
    "dstip":"96.43.148.88",
    "dst_location":"San Francisco",
    "dst_region":"CA",
    "dst_country":"US",
    "dst_zipcode":"94105",
    "dst_latitude":37.789799,
    "dst_longitude":-122.394203,
    "user":"test5@client.skopeit.com",
    "app":"salesforce",
    "action":"ALLOW",
    "org":"client.skopeit.com",
    "numbytes":1856,
    "timestamp":1361848934,
    "url":"na11.salesforce.com/umpsinternal/session/status"
}
]
```

FIG. 11

DEEP APPLICATION PROGRAMMING INTERFACE INSPECTION (DAPII) FOR CLOUD SECURITY

RELATED APPLICATIONS

This application is a continuation of U.S. application Ser. No. 15/213,250, entitled "LOGGING AND MONITORING USAGE OF CLOUD-BASED HOSTED STORAGE SERVICES," filed on 18 Jul. 2016, which is a continuation of U.S. application Ser. No. 14/198,499, entitled "SECURITY FOR NETWORK DELIVERED SERVICES," filed on 5 Mar. 2014, which claims the benefit of U.S. provisional Patent Application No. 61/773,633, entitled, "SECURITY FOR NETWORK DELIVERED SERVICES," filed on Mar. 6, 2013. The provisional application is hereby incorporated by reference for all purposes.

This application is related to U.S. patent application Ser. No. 14/198,508, entitled "SECURITY FOR NETWORK DELIVERED SERVICES," filed on 5 Mar. 2014. The related application is incorporated by reference for all purposes.

FIELD OF THE TECHNOLOGY DISCLOSED

This disclosure is generally related to providing visibility, control and data security for network delivered services.

BACKGROUND

The use of hosted services for a number of corporate functions is now common. Thus, instead of installing servers within a corporate network to run a customer relationship management (CRM) software product, a software as a service (SaaS) solution such as Salesforce.com's offerings can be used. The IT and network architecture approaches that could log and protect access to a classic solution provide limited control. The sprawl of BYOD and the need haul that traffic back to the enterprise make it less attractive. For example, VPN solutions are used to control access to the protected corporate network. Proxies (both transparent and explicit) may be used to filter, or limit access to undesirable web sites when the client is accessing the web sites from within the corporate network. Similar filtering software can be installed on client computers, e.g. safe browsing software, to enforce limits on access. A viable solution should provide consistent, centrally administered control, e.g. enforce the same policy across multiple devices, network services, and networks—including corporate networks.

BRIEF DESCRIPTION OF THE FIGURES

FIGS. 8-9 are exemplary application definitions.

FIG. 11 is an exemplary event log entry.

DETAILED DESCRIPTION

Overview

Figure 1:
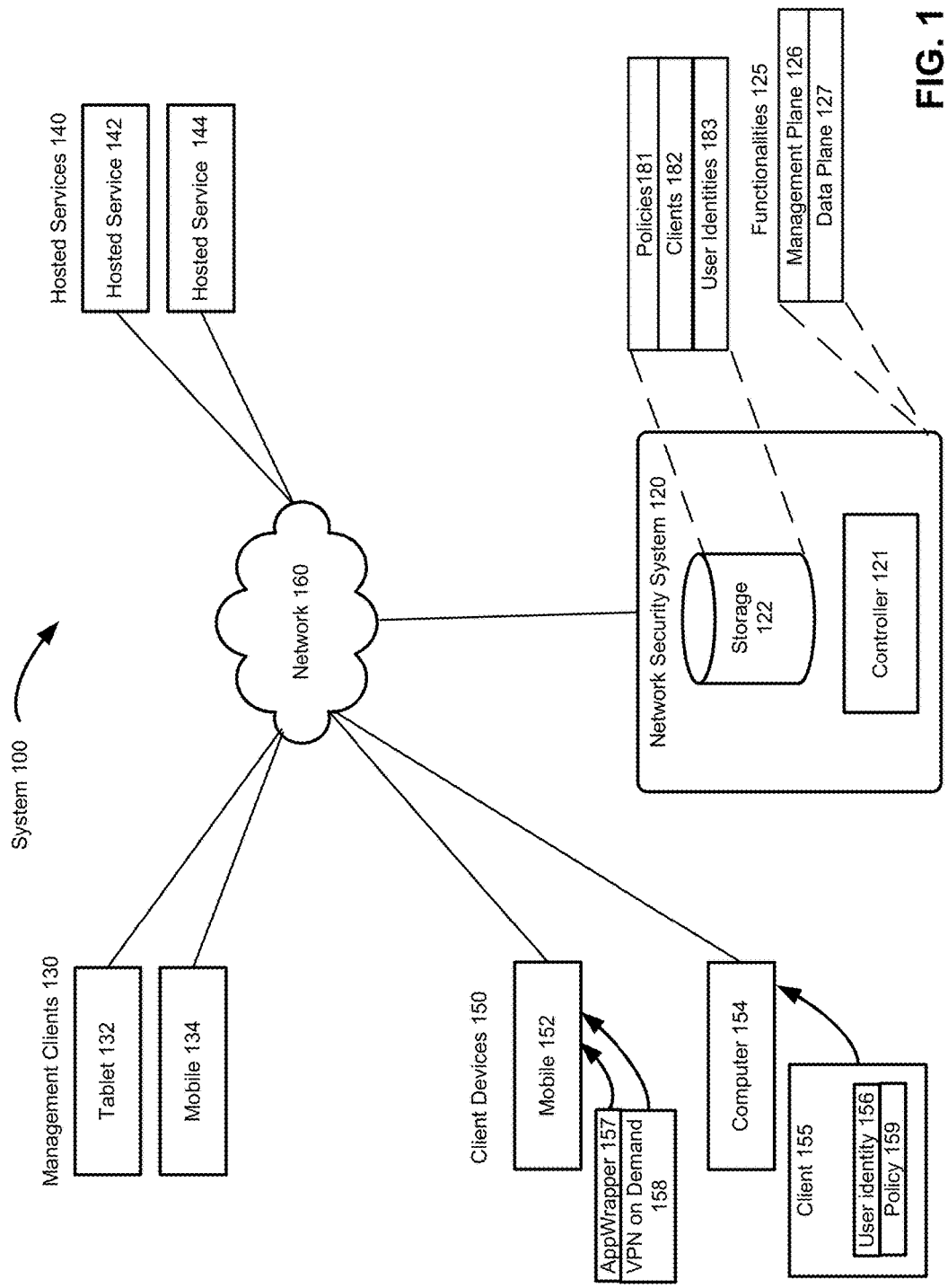
FIG. 1 shows an architectural level schematic of a system in accordance with an embodiment.

The discussion is organized as follows. First, an introduction describing some of the problems addressed by various embodiments will be presented, followed by an explanation of terminology that will be used throughout the discussion. Then, a high-level description of one embodiment will be discussed at an architectural level. Next, the algorithms used by some embodiments to provide security are discussed. Lastly, more detailed architectures for implementing the system, together with filtering rules, models, and application definitions, are discussed.

We describe a system and various embodiments for providing security for network delivered services. Consider the problems faced primarily by corporations seeking to protect their data at the intersection of a bring your own device (BYOD) environment and the proliferation of hosted services. The company may be using Salesforce.com for CRM, Dropbox for storage, and Google Apps for collaboration. While users' devices are using the corporate network, the corporation may have some ability to log and monitor usage of these hosted services with existing network monitoring tools. However, if a user uses the Salesforce.com application with their mobile device over the cellular network, the user's activity is not trackable. Additionally, the trend towards BYOD may also increase the likelihood of enterprise traffic bypassing corporate networks completely.

Further, the activity that is tracked with traditional approaches is very much at the network level. What if you want to log data exports activity from the application? Track large downloads? Only allow users to access certain data or services while their location is within the European Union? Additionally, the system is compatible with existing VPNs, proxies, firewalls, and filtering systems. Thus, one policy could require that access to a particular hosted service by a particular user must be from client devices that are logged into the corporate VPN. For business applications developed by combining components from multiple web application services (sometimes called "mash-ups"), one embodiment provides a consistent, enterprise-wide application level control and policy enforcement.

Some individual hosted services may offer differing levels of security and access controls; one is limited to the specific items implemented by the hosted services as opposed to a uniform, programmable set of controls across multiple hosted applications. This enables the system to provide access controls and event logging that exceed the native capabilities of the hosted service.

One workaround companies use is to require hosted service vendors to deploy into private clouds within the corporate network. Aside from the previously discussed limitations, private clouds require that the company backhaul data to your corporate network for monitoring. In contrast, embodiments provide for centralized client corporate analytics across hosted services. Secondly, some embodiments provide for intentionally allowing "one more" access by a computer that is believed compromised. This approach may allow for better recovery of lost or stolen client devices because the access can be logged. Other embodiments assist in identifying hosted services that should be deactivated for individual users, e.g. user attempts to access service are reported even if the user should no longer have access. Embodiments can also interoperate with single sign-on (SSO) solutions and/or corporate identity directories, e.g. Microsoft's Active Directory. Such embodiments may allow policies to be defined in the directory, e.g. either at the group or user level, using custom attributes.

Also, it should be mentioned that another feature of embodiments is that hosted services configured with the system are also configured to require traffic via the system. This can be done through setting IP range restrictions in the hosted service to the IP range of the system and/or integration between the system and SSO systems. For example, integration with a SSO solution can enforce client presence requirements before authorizing the sign-on. Other embodiments may use "proxy accounts" with the SaaS vendor—e.g. a dedicated account held by the system that holds the only credentials to sign in to the service. In other embodiments, the client may encrypt the sign on credentials before passing the login to the hosted service; this means that the networking security system "owns" the password.

Terminology

Throughout this specification the following terms will be used:

Hosted Service: A hosted service refers to a network hosted service or application, accessed via a uniform resource locator (URL). Examples include both software as a service (SaaS) offerings, platform as a service (PaaS) offerings, infrastructure as a service (IaaS) offerings, as well as internal enterprise applications that are exposed via URLs. Examples of common hosted services today include Salesforce.com, Box.net, Dropbox, Google Apps, Amazon AWS, Microsoft Office 365, Workday, Oracle on Demand, Taleo, Yammer, and Concur. Hosted services provide functionality to users that is implemented in the cloud and that is the target of policies, e.g. logging in, editing documents, downloading bulk data, reading customer contact information, entering payables, deleting documents, in contrast to the offerings of a simple website and ecommerce sites. Note that some consumer facing websites, e.g. Facebook, can be quite complex; however, they lack the concept of a managed/corporate grouping of users and/or data that could be subject to custom policies. Thus Yammer which offers a social network for corporations is the type of hosted service considered here, while the current consumer-oriented Facebook is not. Some services, e.g. Google's Gmail can be a hybrid with some free users using the application generally while other corporations use it as a hosted service. Note that embodiments can support both web browser clients and application clients that use URL-based APIs. Thus, using Dropbox as an example, user activity on the Dropbox website, as well as activity of the Dropbox client on the computer could be monitored.

User Identity: User identity, or user identification, in the context of this specification refers to an indicator that is provided by the network security system to the client device. It may be in the form of a token, a unique identifier such as a UUID, a public-key certificate, or the like. In some embodiments, the user identity may be linked to a specific user and a specific device; thus, the same individual may have a different user identity on their mobile phone vs. their computer. The user identity may be linked to an entry or userid corporate identity directory, but is distinct from it. In one embodiment, a cryptographic certificate signed by the network security is used as the user identity. In other embodiments, the user identity may be solely unique to the user and be identical across devices.

Policy: The term policy, sometimes also referred to as a policy definition or policy data, refers to a machine-readable representation of flow control and logging requirements for hosted services. Typically, a policy is defined by one or more administrators at a corporation, or other entity, and is enforced upon users within that corporation, or entity. It is possible for individuals to define policies for their own usage that are enforced upon them; however, corporate usage is the more common case. It is also possible for a policy to be enforced on visitors or customers of a hosted service, e.g. where a corporation hosts a service and requires visiting customers to adhere to the policy for use. Of particular note is that the policies considered herein are capable of being sensitive to the semantics of a hosted application, which is to say a policy can differentiate between logging in to a hosted service from, say, editing documents on the hosted service. Context is important for understanding usage; for an entity, the collection of dozens or hundreds of individual policies (e.g. log bulk downloads, prohibit editing documents on the service, only allow bulk downloads for users who are in the "Vice President" group) is referred to singularly as one policy, or one policy definition. Thus, a system supporting multiple entities will generally have one policy per entity, each made up of dozens or hundreds of individual flow control and logging policies. Similarly, as discussed infra, the policy that is transferred to individual computers may be a subset of a full corporate policy, e.g. solely a machine-readable representation of the URLs of interest, as opposed to the full policy specification for each URL describing the flow control and/or logging behaviors.

Mobile and Tablet vs. Computer: Portions of the specification may make distinctions between two types of client devices used by users to access hosted services. The primary distinction is between the mechanisms for coupling the client device to the network security system. In relation to client devices, the term "computer" will refer to more open systems where the network security system can more directly install software and modify the networking stack. Similarly, in relation to client devices, the terms "mobile" or "tablet" will refer to more closed systems where the network security system options for modifying the network stack are more limited. This terminology mirrors the situation today where computer-client devices running Mac OS X, Windows desktop versions, and/or Linux can be more easily modified than mobile or tablet devices running iOS, Android, and/or Windows Mobile. Thus, the terminology refers to how third-party operating system vendor limitations are addressed to provide access to the network security system as opposed to a fundamental technical difference between the types of client devices. Further, if mobile OS vendors open their systems further, it is likely that the distinction could be eliminated with more classes of client devices using the embodiment described in the computer-client discussions. Additionally, it may be the case that certain server computers and other computing devices within an organization may have the client installed to cover machine-to-machine communications.

A closely related point is that some clients interface with the network security system differently. The browser add-on clients, for example, redirect the browsers to an explicit proxy. Only the traffic needed to apply the policy to is rerouted and it is done so within the application. The traffic arriving at the network security system can have the user identity embedded in the data or within the secure tunnel headers, e.g. additional headers or SSL client side certificates in some embodiments. Other clients redirect select network traffic through transparent proxies. For these connections, some traffic beyond exactly those requests needed by the policy may be routed to the network security system. Further, the user identity information is generally not within the data itself, but rather established by the client in setting up a secure tunnel to the network security system.

System Overview

We describe a system and various embodiments for providing security for network delivered services. The system and processes will be described with reference to FIG. 1 showing an architectural level schematic of a system in accordance with an embodiment. Because FIG. 1 is an architectural diagram, certain details are intentionally omitted to improve the clarity of the description. The discussion of FIG. 1 will be organized as follows. First, the elements of the figure will be described, followed by their interconnections. Then, the use of the elements in the system will be described in greater detail.

FIG. 1 includes the system 100. The system 100 includes network security system 120, management clients 130, the hosted services 140, client devices 150, and network 160. The network security system 120 includes the controller 121 and storage 122. The storage 122 stores, among other things, policies 181, clients 182, and user identities 183. See the discussion of FIGS. 6-7 for additional items that are typically included in the storage 122. The network security system 120 can be viewed as providing several functionalities 125; key among them are a management plane 126 and a data plane 127. The management clients 130 include tablet 132 and mobile 134. The hosted services 140 include the hosted service 142 and the hosted service 144. The client devices 150 include the mobile 152 and the computer 154. The mobile 152 includes an AppWrapper 157 and a VPN on demand 158. The computer 154 includes a client 155 which in turn includes the user identity 156 and a policy 159.

The interconnection of the elements of system 100 will now be described. The network 160 couples the tablet 132, the mobile 134, the mobile 152, the computer 154, the hosted service 142, the hosted service 144, and the network security system 120 in communication (indicated by solid lines). The actual communication path can be point-to-point over public and/or private networks. Some items, such as AppWrapper 157, might be delivered indirectly, e.g. via an application store (not shown). All of the communications may occur over a variety of networks, e.g. private networks, VPN, MPLS circuit, or Internet, and may use appropriate APIs and data interchange formats, e.g. REST, JSON, XML, SOAP and/or JMS. All of the communications can be encrypted. This communication is generally over a network such as the internet, inclusive of the mobile internet, via protocols such as EDGE, 3G, LTE, Wi-Fi, and WiMAX. Additionally, a variety of authorization and authentication techniques, such as username/password, OAuth, Kerberos, SecureID, digital certificates, and more, can be used to secure the communications.

Controller 121 and storage 122 can include one or more computers and computer systems coupled in communication with one another. They can also be one or more virtual computing and/or storage resources. For example, controller 121 may be one or more Amazon EC2 instances and storage 122 may be an Amazon S3 storage. Other computing-as-service platforms such as Force.com from Salesforce, Rackspace, or Heroku could be used rather than implementing network security system 120 on direct physical computers or traditional virtual machines. Additionally, to implement the functionalities 125 one or more points of presence (POPs) may be established. For example, the data plane 127 POPs may be distributed geographically and/or co-hosted with particular hosted services. Similarly, the management plane 126 POPs may be distributed geographically. The two types of POPs may be either separately hosted or co-hosted as well.

Having described the elements of FIG. 1 and their interconnections, elements of the figure will now be described in greater detail. The network security system 120 provides a variety of functionalities 125 including providing a management plane 126 and a data plane 127. Other functionalities, e.g. control plane, may also be provided. These functionalities 125 collectively provide secure network access to the hosted services 140 by client devices 150. Although we use the term network security system to describe network security system 120, more generally the system provides application visibility and control functions as well as security.

The management clients 130 according to one embodiment are computing devices with a web browser with a secure, web-delivered interface provided by the network security system 120 to define and administer policies 181. The network security system 120 according to some embodiments is a multi-tenant system, so a user of a management client can only change policies 181 associated with her organization. In some embodiments, APIs may be provided for programmatically defining and or updating policies. In such embodiments, the management clients 130 might include one or more servers, e.g. a corporate identities directory such as a Microsoft Active Directory, pushing updates and/or responding to pull requests for updates to the policies 181. Both systems may co-exist; for example, some companies may use a corporate identities directory to automate identification of users within the organization while using a web interface for tailoring policies to their needs. Management clients are assigned roles and access to the network security system 120 data is controlled based on roles, e.g. read-only vs. read-write.

Figure 2:
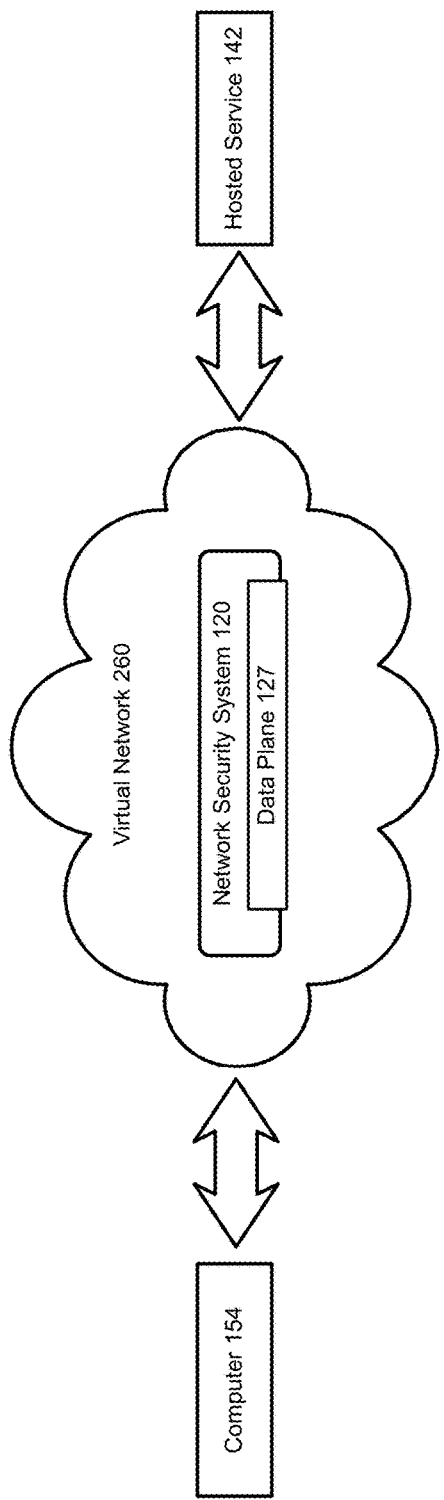
FIG. 2 shows the virtual network topology of a system in accordance with an embodiment.
Figure 3:
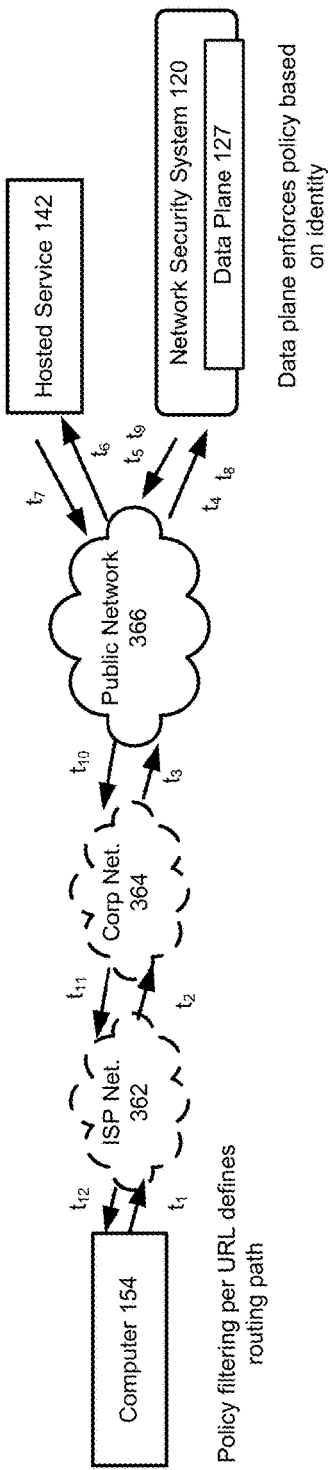
FIG. 3 shows a more detailed network topology and data flow of a system in accordance with an embodiment.

The function of the network security system 120 with respect to client devices 150 is easier to describe in conjunction with FIGS. 2-3: FIG. 2 shows the virtual network topology of a system in accordance with an embodiment; FIG. 3 shows a more detailed network topology and data flow of a system in accordance with an embodiment. For both figures, an attempt by a user of computer 154 to access hosted service 142 is shown. FIG. 2 shows a conceptual view of the communication path with the network security system 120 and the data plane 127 serving to create a virtual network 260 intermediating communications between the computer 154 and the hosted service 142. FIG. 3 shows one possible network topology for the same communication with the computer 154 coupled to an ISP network 362 (optional) which is in turn coupled to a corporate network 364 (optional) which is in turn coupled to the public network 366. The public network 366 is in turn coupled to the hosted service 142, and the network security system 120 and the data plane 127. Although FIG. 3 is one possible network topology, it remains a simplified, architectural view rather than a direct network layout. For example, the networks that the hosted service 142 and the network security system 120 operate on are not shown, e.g. the service providers (also ISPs) for both are omitted. FIG. 3 includes time stamps $t_1$ to $t_{12}$ that highlight the sequential routing order that the client 155 causes requests to the hosted service 142 to take. Of particular note is that requests, such as a web browser HTTP GET request for a URL of a hosted service, are routed atypically. Specifically, the client 155 identifies the request and causes the route to go $t_1$ to $t_4$ and into the network security system 120 rather than to the hosted service 142. The network security system 120 analyzes the user identity 156 and the applicable policy before routing the request to the hosted service 142, $t_5$ to $t_6$. Notably, from the perspective of the hosted service 142, the request will go back to the network security system 120, $t_7$ to $t_8$, rather than directly to the computer 154. The network security system 120 can analyze the returned data, apply further policies in a user identity 156 dependent fashion and then return the response from the hosted service 142 to the computer 154, $t_9$ to $t_{12}$. FIG. 3 also highlights that the client 155 is compatible with—and distinct from—existing VPN, proxy and network monitoring solutions. In FIG. 3, the network access of computer 154 is being routed using a VPN solution onto the private corporate network 364. This also means that corporate proxy, firewall, and content filtering policies can generally be applied. The corporate proxy should be configured with appropriate rules to forward chain requests to the network security system 120. Additionally while FIGS. 1-3 focus on a primarily hosted network security system 120, it is possible to have an "on premise" or enterprise hosted private solution. In such an embodiment, all or portions of the network security system 120 may be completely within the corporate network.

As discussed, the corporate administrator should have previously configured the hosted service 142 to service requests for users of the corporation from the network security system 120. This prevents client devices 150 that are lacking the client 155 (or the counterparts for mobile) from bypassing the policies enforced by the network security system 120. As noted, other approaches to ensuring that hosted services are only accessed through the network security system 120 can be employed.

Returning to FIG. 1, a general view of how the network security system 120 functions has been provided. Companies, or more generally any individual or entity, wishing to better secure their use of network hosted services sign up with the network security system 120. Using a web-based interface and a computer device, the company can establish a policy in policies 181 for their users. For each user—and optionally each device—a user identity (e.g. user identity 156 stored with user identities 183) is generated by the network security system 120. The user identity 156 together with an appropriate client (e.g. client 155 selected from clients 182) are installed into the user's client device(s) 150. For example, for a computer such as computer 154, a client 155 with the user identity 156 included is loaded. For a mobile device, multiple approaches can be used: a VPN on demand 158 can be installed (included in clients 182) and/or wrapped applications such as AppWrapper 157 can be installed. These approaches will both be discussed now in greater detail.

Client Installation and Processes

The onboarding process and hosted service access provided by the network security system 120 will be described first by focusing on computer-style client devices.

Consider a user's first access with computer 154. First, an administrator must enroll the user via the management interface. In one embodiment, after enrollment by administrators, email provisioning is provided. The email includes a hyperlink or similar mechanism for the user to download and install a client that is either: (a) browser add-ons and/or (b) secure tunneling agents. Additionally, a user identity (e.g. user identity 156) and a policy (e.g. policy 159) will be provided, either embedded into the downloaded client 155 or as standalone items. The browser add-on, or extension—the terms will be used interchangeably—functions in an analogous fashion to existing web browser PAC files; however, because the specific routing is dynamic based on the policy, and client certificates representing the user identity are used, the browser add-on/extension embodiment is chosen in one embodiment. In another embodiment, the add-on regularly updates the proxy auto-config (PAC) file for the browser that contains the appropriate URLs for routing to the network security system 120 and applies the appropriate user identity information.

If a user has multiple web browsers installed, add-ons may be installed for each browser—or only for certain browsers depending on the policies set by the administrator. Here, the policy 159 is a machine-readable representation of the URLs that should be routed through the network security system 120. As discussed, supra, this is a subset of the full policy (itself a collection of dozens or hundreds of individual policies) that are defined on the network security system 120 by the user's company. Thus, the policy would indicate that URLs like Yahoo! Finance would likely not be routed to the network security system 120, while a hosted service like the corporate SaaS CRM solution, Salesforce.com would be. Because the URLs affected by the policy are kept client side, the policy 159 can also be periodically updated from the network security system 120 by the client 155. As noted, according to one embodiment the user identity 156 is a certificate that is used to sign the packets routed to the network security system 120. In other embodiments, the certificate is provided on connection with the SSL/TLS connection establishment and then packets are transmitted normally.

The secure tunneling agent client 155 is a more traditional standalone application. Whether or not it is installed is similarly configured by the administrator, e.g. in the policy for that user. The secure tunneling agent helps secure hosted services that operate outside the web browser, e.g. a Dropbox that has an application client. One embodiment divides the secure tunneling agent into two components, (i) a network driver loaded into the kernel that performs packet analysis combined with (ii) a user service that provides a secure tunnel for the packets to the network security system 120. Embodiments cache DNS results and perform reverse DNS lookups, or sniffing, to identify network requests targeted for URLs covered by the policies and to re-target those requests to the network security system 120 after signing the requests with the client certificate.

In the browser add-on case, the network security system 120 serves as an explicit proxy. In contrast, in the secure tunneling agent computer client embodiments, the network security system 120 serves a transparent proxy to the hosted service. The mobile clients similarly divide with the VPN on demand approach working like an explicit proxy while the AppWrapper approach working like a transparent proxy. The primary distinction between the process flow of FIG. 4 and that of FIG. 5 is that FIG. 4 focuses on the more client-focused (generally explicit) proxy case while FIG. 5 focuses on the more server-focused (generally transparent) proxy case.

Figures 4, 5:
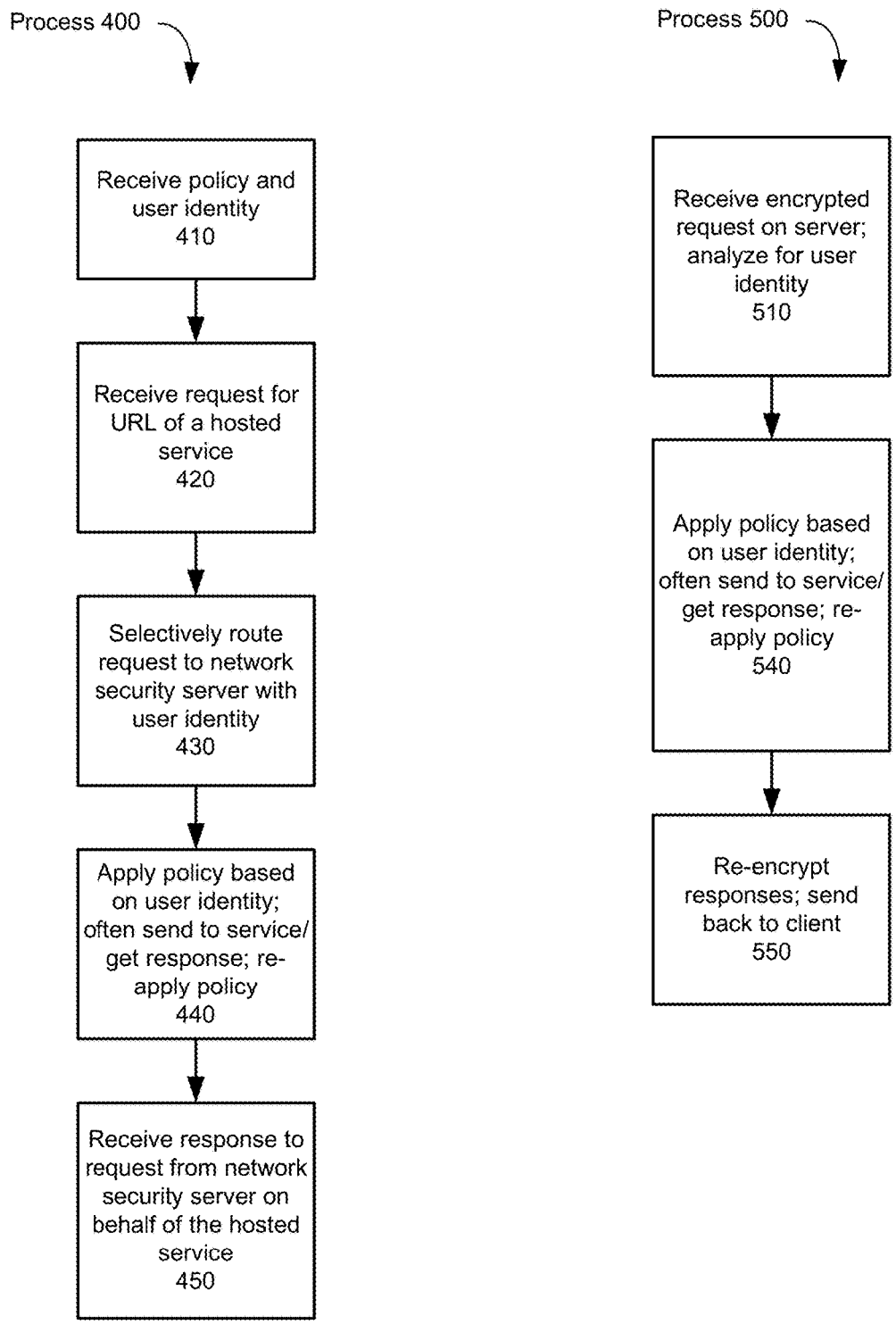
FIGS. 4-5 are process flow diagrams for policy enforcement.

FIG. 4 is a process flow diagram of policy enforcement focused on the client device perspective. FIG. 4 includes process 400 which begins at step 410, where the policy and user identity are received. As discussed, supra, the policy may be periodically updated. Additionally, the policy and/or user identity may be bundled into the client such as a browser add-on or a secure tunneling agent.

Process 400 continues at step 420 with a request for a URL of a hosted service being received. In the browser add-on context, the URL is directly received and subject to analysis. This may also allow for subtle differentiation, e.g. handling subdomain.domain.tld differently from www.domain.tld. In contrast, in the case of the secure tunneling agent, network packets destined to IP addresses that match the DNS resolution of a URL controlled by the policy are identified. Thus, if subdomain.domain.tld and www.domain.tld share the same network address, both will be routed even if the policy only applies to one and not the other. This type of "failure" will generally lead to over-inclusion on the client side. The over inclusion is handled appropriately on the server side.

In some embodiments, the network security system performs application signature generation to assist companies in generating policies that describe hosted services easily. Signature generation includes periodically crawling a predefined list of domains of hosted services. For each hosted service, the URLs referred to by the pages crawled that do not need an account or login are identified. This is a "whitelist" of URLs associated with a hosted service that are generally outside of the policies. Similarly, a list of domains and associated URL formats that correspond to a given hosted service can be provided, this becomes a "blacklist" of URLs. In one embodiment, the blacklist is manually maintained. Thus for a policy definition that applies to hosted service X would include URLs and/or a signature in the client-side policy of the browser add-on to make a decision about whether or not the policy applies as follows.

First, extract the domain name and URL are extracted from the HTTP request. Second if the domain name or URL is on the blacklist or contains a variation of the company identifier (e.g. if company identifier is "netskope" or "exampleco" look for "hostedservice.com/netskope" or "exampleco.hostedservice.com") treat the request as a request for the application. Note in some embodiments, the administrator for a company can identify the company-specific identifier used for each hosted service via the management interface. Similarly, if the domain name or URL is present on the whitelist the request can be bypassed.

This approach can also be used on the server side to limit the application of policies to relevant URLs. Additionally, in some embodiments the crawling process identifies a list of URLs corresponding to login events for various hosted services. This list can assist in identifying hosted service login events.

In other embodiments, operators of hosted services may provide information to the operator of the network security system to assist in policy definition and identifying whitelists/blacklists.

Next, at step 430, the URL is selectively routed according to the policy. For URLs that are not covered by the policy, the normal host operating routing system is applied (not shown). For those that are covered by the policy, the request is signed using the user identity and routed to the network security system 120.

At step 440, the policy is applied based on the user identity 156. Counterintuitively, even prohibited hosted services and their corresponding URLs generally reach step 440 to enable server-side logging. In a similarly counterintuitive vein, deactivated user identities (including for stolen/lost devices) can be set to a "compromised" state on the network security system 120. This allows one use—or perhaps more—of the computer but denies access. Thus, a user identity that has been marked as "compromised" appears to connect to the network, specifically network security system 120, but is rebuffed by the policy at step 440 from accessing the hosted service. However, the activity and other information about the compromised client device can be logged and/or reported out. Still other embodiments may download computer programs and/or trigger programs in the client to deactivate the client device and/or to indicate to the user that that device is lost or stolen.

Returning to process 400 and step 440, a typical policy will log certain events, see infra, associated with the request and generate a new request to the hosted service (see FIG. 3 and $t_5$ to $t_8$). When the hosted service responds to that request, optionally, further policy filtering can occur.

Normally though, at step 450 the response from the hosted service is received using the client identity and sent back with the client device from the network security system 120. Note, as discussed infra, this response is typically inspected and subjected to policy before being sent back to the client device.

Notably, process 400 reinforces the points made in discussing FIGS. 2-3: conceptually (FIG. 2) there is a virtual network 260 between the computer 154 and the hosted service 142, and it is implemented (FIG. 3) with requests from the computer for the hosted service going to the network security system 120 instead of to the hosted service.

Application definitions, discussed infra, allow fine-grained control. Thus, if graphics resources for a service are hosted at a distinct URL, they can be exempted from the application definition and thus excluded from the policy.

Turning the discussion to mobile clients, as noted the primary distinction is the flexibility provided by operating system vendors to modify applications and/or install software. As noted, supra, the rationales for these restrictions are not generally technical limitations of the operating system, but rather contractual and/or embodiment decisions of the operating system vendor. For example, although the Google Chrome web browser for desktop operating systems can support an add-on client, Google Chrome for Android has add-ons turned off. Similarly, contractual rules set by Apple for the App Store limit the ability of an installed piece of software to install network drivers or modify other applications.

Thus, for mobile, two primary client embodiments are used at present. Both achieve a similar effect of providing traffic to the network security system 120 for more detailed analysis. The first embodiment is to custom-wrap the application, e.g. AppWrapper 157. Thus, instead of installing the general Dropbox client from the Apple App Store, you would install a version of the client wrapped in the mobile device management (MDM)/mobile application management (MAM) policies to tunnel traffic to the network security system 120. This approach relies on the corporate administrators' capability to wrap applications corresponding to one (or many) hosted service. Depending on the client platform, the corporate administrator may have to wrap each application individually, or alternatively leverage an application sandboxing solution to wrap multiple applications. The other embodiment is to install a VPN on demand 158. On certain platforms—most noticeably iOS—the VPN on demand 158 embodiment would tunnel all traffic, or all traffic on certain ports, to the network security system 120 when the VPN is active. On iOS, for example, this second embodiment is analogous to the approach used for network accelerators. In some other embodiment, a VPN on demand may support "split tunneling," forwarding only select traffic to the system. In the split tunnel case, this second embodiment is functionally analogous to the secure tunneling agent client 155. Either approach ensures that the mobile client is configured to trust the SSL certificate used by the network security system 120 across multiple domains to allow something analogous to the behavior of certain proxy interception and analysis techniques.

The server-focused handling used by secure tunneling approaches is discussed in FIG. 5. FIG. 5 includes process 500 which starts at step 510 with the network security system 120 receiving an encrypted request for analysis. At step 510, the encrypted request is received and analyzed, the user identity is determined, and the packet is prepared for handling by the rest of the network security system 120. More specifically, the encrypted request is decrypted, analyzed to identify applicable policies (which are applied). Then prior to transmission to the hosted service, the communication is re-encrypted. As noted above, whereas in the computer-client case the network security system 120 was functioning more analogously to an explicit proxy, step 510 must handle the request in an analogous fashion to a transparent proxy. Additionally, user identity is typically identified in this case from the tunnel set up information this is in contrast to step 430, where at least for the explicit proxy case, the user identity information is embedded into the request that goes to the network security system itself. This dual operation of the network security system 120 is notable as are the dual mechanisms for the system to retrieve user identity information from client transmissions.

Next, at step 540 (analogous to step 440) the policy is applied. Note that, in contrast to step 440, it is more likely (if over-tunneling is occurring) that non-covered services, e.g. Yahoo! Finance, as opposed to covered services, are being routed through the network security system 120 for analysis. For services covered by the policy, appropriate event logging and policy enforcement occurs. If appropriate, the request is sent to the hosted service (or the other website), and when the response is received, the policy can optionally be applied again. Finally, at step 550 the response is sent back to the mobile client. As at step 510, precautions need to be made to handle the return response so that it is accepted by the mobile clients similarly to those made by a transparent proxy.

Points of Presence Architecture

Having discussed the functionality, the embodiment architecture used by one embodiment will be discussed in connection with FIGS. 6-7. As discussed, supra, the functionalities 125 of the network security system 120 divide into two primary groups: management plane 126 and data plane 127. Additionally, a control plane may be used. The specific division of functionality between these planes is an embodiment choice. Similarly, the functionality can be highly distributed across a number of points of presence (POPs) to improve locality, performance, and/or security. For example, either management plane or data plane POPs can be co-located with hosted services or with corporate networks.

Figure 6:
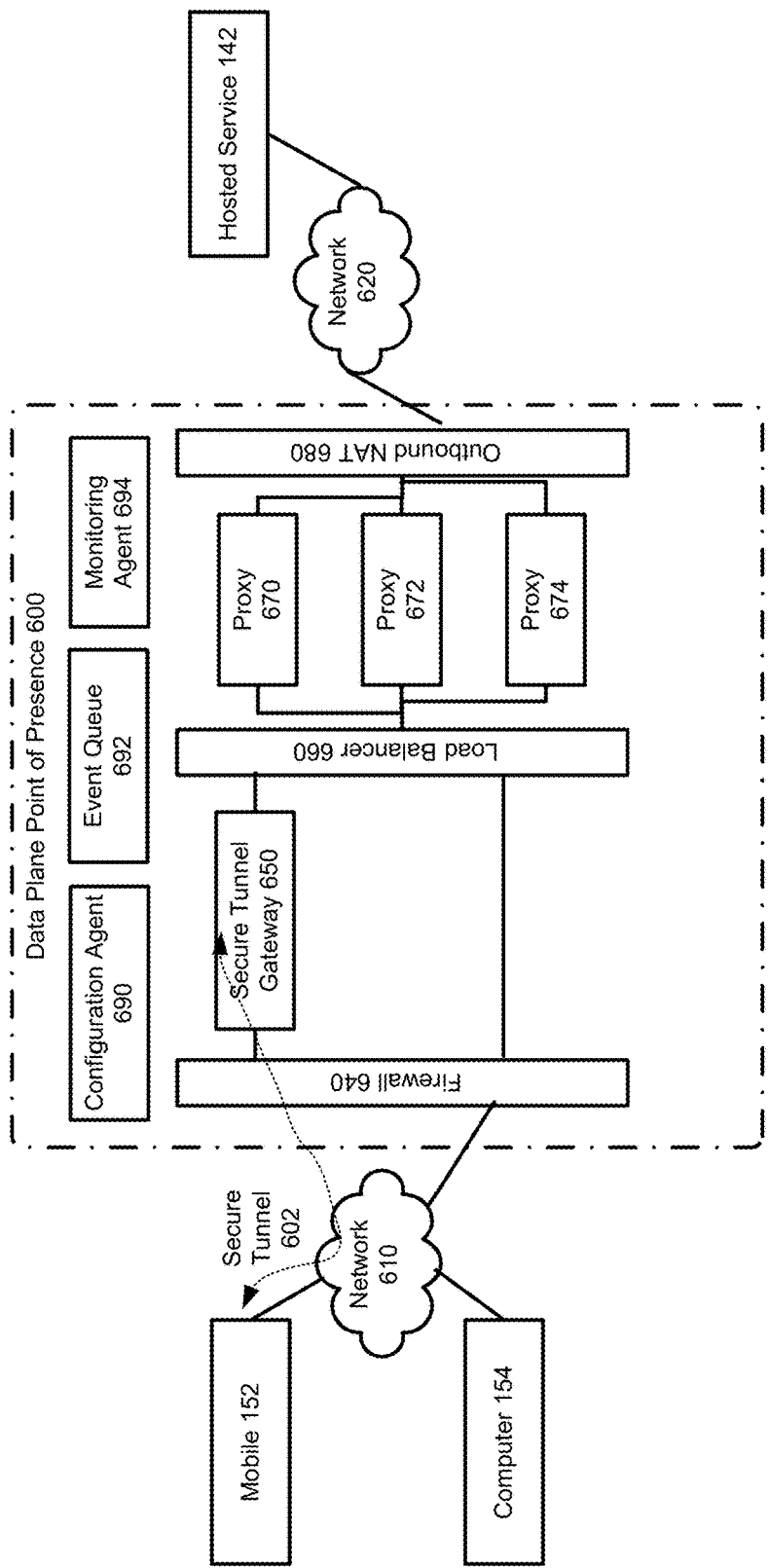
FIG. 6 shows an architectural level schematic of a data plane point of presence.

FIG. 6 shows an architectural level schematic of a data plane point of presence. FIG. 6 includes a data plane point of presence 600 (dashed-dotted box) connected to network 610 and network 620. These can be the same networks or different networks. Network 610 is also connected to client devices 150 such as mobile 152 and computer 154. Network 620 is connected to the hosted service 142. The data plane functionality is implemented according to one embodiment with multiple computers, storage, and networking gear across multiple POPs such as data plane POP 600. The elements of data plane POP 600 include a firewall 640, a secure tunnel gateway 650 (see discussion of mobile clients, supra), a load balancer 660, multiple proxies 670, 672, and 674 (each proxy implements the policies according to the current configuration), and an outbound NAT 680. The architecture can be further scaled, e.g. multiple firewalls, etc. The proxies 670, 672 and 674 implement the specific policy, e.g. drop, reset, redirect, requests (or entire flows), as well as generate the logging messages.

The data plane POP 600 also includes a configuration agent 690 for receiving configuration and policy information from the management plane, an event queue 692 for recording and/or storing events to be sent to the management plane, and a monitoring agent 694 for monitoring the performance and status of the data plane POP 600. These items are generally coupled in communication with one or more management plane POPs, e.g. management plane POP 700 of FIG. 7, as well as the other elements of the data plane (not shown in order to focus on the data flow). Similarly, the configuration systems are not shown here. The difference between configuration and policy is that configuration information is information provided by the operator of the network security system 120, e.g. how many data plane POPs to have active, what version of the proxy software to load, etc., while policy information is provided by administrative users of the system, e.g. corporate IT personnel.

Also shown in FIG. 6 is an example of the secure tunnel 602 used by mobile 152 and other mobile clients. In contrast, the data from computer 154 is routed directly from the firewall 640 to the load balancer 660. As discussed some client types use secure tunnels (here one is being used for mobile) and others do not (here one without a secure tunnel is being used for the computer).

Figure 7:
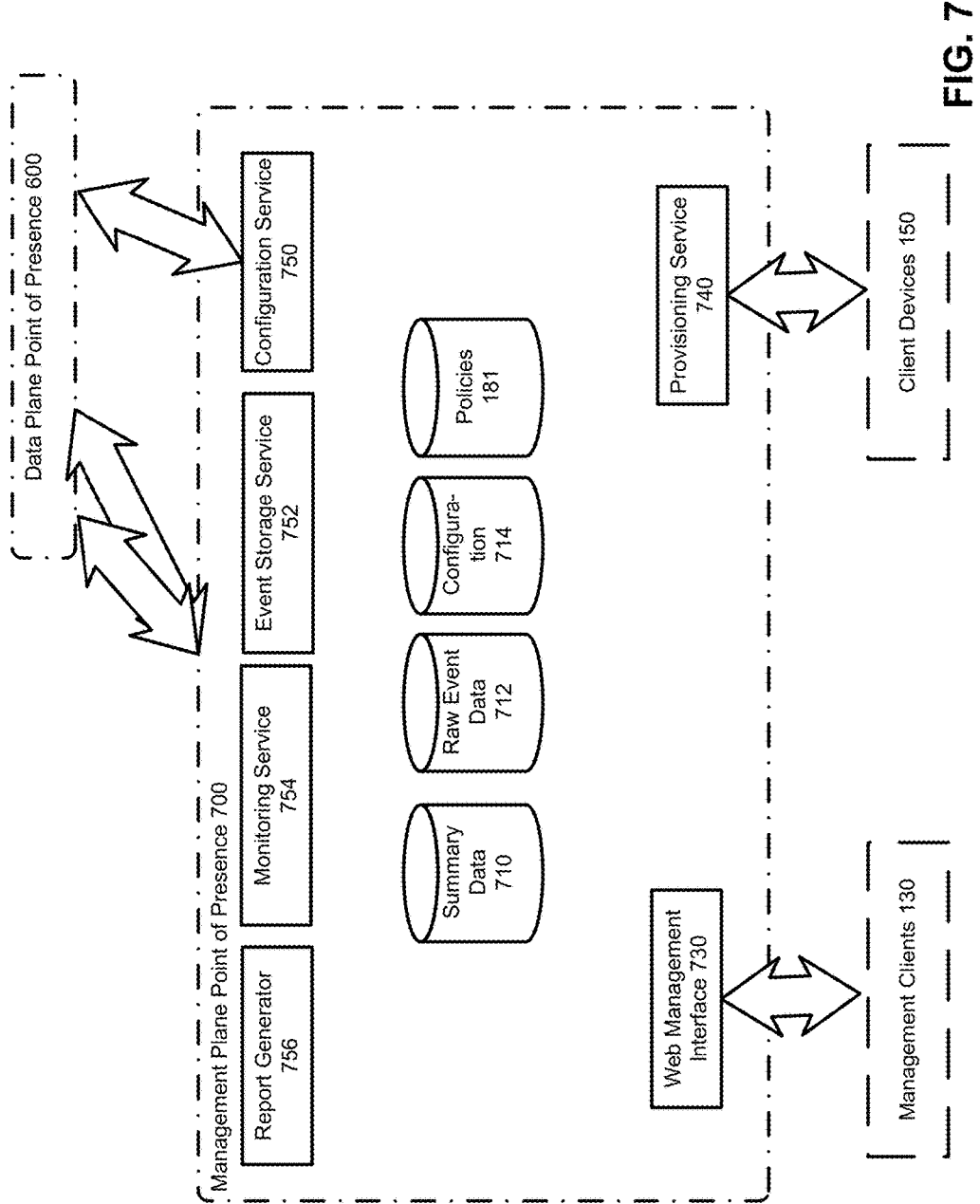
FIG. 7 shows an architectural level schematic of a management plane point of presence.

FIG. 7 shows an architectural level schematic of a management plane point of presence. FIG. 7 includes a management plane POP 700 to implement the management plane 126 functionality. Some embodiments may have only a single management plane POP, while others may have multiple POPs. The inter-relationship and communications with the data plane POP 600 are shown in FIG. 7 with large double-headed arrows. The communications between management clients 130 and the client devices 150 and the management plane POP 700 are similarly represented.

Management plane POP 700 includes: summary data 710, raw event data 712, configuration 714, policies 181, web management interface 730, provisioning service 740, configuration service 750, event storage service 752, monitoring service 754, and report generator 756. The services bridge the management/data planes: configuration service 750 communicates with configuration agent 690; event storage service 752 communicates with event queue 692; monitoring service 754 communicates with configuration agent 690. The report generator 756 is a management-plane-only item in this embodiment, combing the raw event data 712 to generate summary data 710 for reporting. The web management interface 730 enables administration and reporting via web browsers. The provisioning service 740 provides client devices with the appropriate client (e.g. client 155 or VPN on demand 158 from clients 182) as discussed, supra, for configuration. The provisioning service 740 may also be responsible for providing policy updates to client devices 150. In other embodiments, event storage service 752 and/or monitoring service 754 may accept data directly from hosted services and/or other sources for unified logging and reporting.

Policies and Application Definitions

Embodiments may support two primary types of individual policies: logging policies (e.g. events) and flow step policies (e.g. what happens to the user's request). The two types are related, but administrators may conceptualize them differently. Accordingly, they may be distinctly administered in some embodiments, while in other embodiments a single policy type exists with configuration options to indicate whether a given policy is one or the other type. Customers can establish defaults for what types of events are logged—note that in some embodiments event tracking occurs but is not shown to users based on their log level. Thus, a user might only want to see certain security violations, but the operator of the system may want to track all secure tunnels (e.g. secure tunnel 602) created for mobile devices. Thus, the event services would capture the event but record it in such a way that it might not be visible to the administrator.

For logging policies, the default behavior in one embodiment is for the administrator to pick a logging level from a selection of levels defined by the operator of the network security system and only events of that level (and more severe) are shown. The administrator can then tailor the logging by adding more events under certain conditions. For example, log level severe only but add policies for downloads to disk from an application or hosted service. A sample set of logging policies according to one embodiment includes the following:

| Level | Conditions/Options | Sample Logged Event Info |
|---|---|---|
| 1. One event per connection | Default. Applied when there is no more specific policy. | Network flow variables; device info (if available); system-generated flow statistics (e.g. latency/number of bytes, etc.). |
| 2. User/Group | Based on user identifier (e.g. client certificate); can log all activity for a period of time. | User and group information; additionally, unknown users can be flagged. |
| 3. Service specific | Based on matching service-specific condition variables. | Information on the application, e.g. resource, (custom) condition variables, and custom triggered events. |
| 4. Log everything | Generally should be time-limited to conserve data storage. | Per HTTP transaction detailed logging. |

For flow action policies, there is a default to "permit" (or default to "deny") policy and then administrators supplement the policy with application-, user-, and group-specific policies. If only one flow action policy matches, then a determination is made whether to drop, reset, or redirect a particular request (or entire flow of requests/responses). If multiple policies match, different rules can be used by the system to pick the priority, e.g. most specific policy to least specific policy (most conditions matched), first policy tested in sequence that matches (administrator can re-order), most restrictive policy outcome selected (drop wins over reset wins over redirect). Generally a policy can be considered as testing a set of match conditions and the performing one or more actions. The most common actions are permit, block (or deny), redirect (asks client to go to another site, might prompt user to request permissions from the administrator), log, reset (drops the TCP connection) and encrypt (data within application payload). Another action could be to invoke another external service integrated in the network security server or outside to process the data further. We will use "block" as a common example of a policy action in the below descriptions, but more generally any action can be applied.

Condition variables are used to determine policy matches for both logging and flow actions. The policy itself can define a match in terms of condition variables tested for a simple direct match, hierarchical parent/child matches, and/or more complex logical matches.

Turning to the condition variables, time windows can be specified (window types may also include time/date information to narrow the window):

| Time Window Type | Description | Evaluation |
|---|---|---|
| Always | Apply policy all the time. | Default value of policy in one embodiment. |
| Weekly | A day of the week. | Based on calendar of the locale, e.g. Saturday. |
| Daily | A specific time within the day. | Time range in the locale, e.g. 9am-5pm. |
| User defined | A window specified by a start time and an end time. | Generally specified as a full UTC date-time range, e.g. a block during a three-day company shutdown could be specified for US operations. |

Continuing, there are network and HTTP flow condition variables:

| Variable | Description | Evaluation |
|---|---|---|
| client public source IP | The public IP visible to the system. | CIDR match; can also be used for geolocation. |
| client internal source IP | The internal IP used within a NAT'ed network. | CIDR match; can also be used for geolocation; however, administrator may want it if it is from a known network. |
| http_req_resp_size | The total size in number of bytes. | Numerical thresholds. |
| http_method | The HTTP method is sometimes useful if admin wants to disable POST. | Match, e.g. against values such as: "POST"/"GET"/"PUT". |

Additionally, geolocation mapping is supported, and depending on the library/libraries used, e.g. maxmind geoip library, different condition variables may be available, e.g. city, country, region, postal code, latitude, longitude.

Application variables are linked to the application definitions which provide the signatures for specific applications. Thus, as discussed, infra, in connection with FIGS. 8-9, specific resources and even custom condition variables can be exposed on a per-application basis. Also, matches may be any of literal matches, pattern matches, and/or regular expression matches.

| Variable | Description | Evaluation |
| --- | --- | --- |
| Application identifier (or name) | Identity of application | Match; may be grouped, e.g. a collection of Google-hosted services may be interlinked. |
| Resource identifier (or name) | Identify a "resource" of a hosted service; resources are generally defined by a URL or URI path. Resources correspond to method invocation for many hosted services. | Match, within the scope of a hosted service, e.g. a resource for hosted service A does not impact flows for hosted service B. |
| Custom variables | Custom variables are defined by application definitions to extract and store key information, e.g. a login name. | Match. |
| Custom event triggers | Custom triggers are defined by application definitions to signal significant events, e.g. user login. This can trigger a "login-failed" event. Policies can be defined to take action when the custom trigger occurs. | Match. |

Triggers are a way to decouple policy, which may be updated more often from the application definitions. Triggers correspond to specific operations, e.g. an "edit contact" performed causes a trigger that is responded to by the policy to determine what action to take. A common, default action is to log such events. Another example of trigger is to match certain application attack signatures or confidential information like SSN or credit card.

User-related variables are another collection of condition variables:

| Variable | Description | Evaluation |
| --- | --- | --- |
| User identifier (or name) | User's identifier, or name, from the user identity. | Match. |
| Group identifier (or name) | A group identifier or name. | Supports hierarchical containment, e.g. vice president group is a subset of all employees group. Note, engine can shortcut user identifier matching in some cases, e.g. if group is denied then skip user checks. |
| Account name | Sometimes a user can have different SaaS accounts or SSO, in which case a SaaS account can be treated as an alias. | Match. This can also allow users to have different permissions based on roles. For example, if a user John has a general account and a sysadmin account with hosted service X, only the sysadmin account with hosted service X might be authorized to use certain sysadmin resources. |

Lastly, device and client platform condition variables are available, such as browser family (e.g., Chrome, Internet Explorer, Safari), OS family (e.g., Windows, iOS, MacOS, Linux, Android), OS subfamily (e.g. for Windows: 7 vs. Vista), device type (e.g. desktop, mobile), device subtype (e.g. for desktop: PC vs. Mac, for mobile: tablet vs. smartphone).

Application definitions of hosted services define how interactions with hosted services should be used. The language to represent application definitions is related to the Web Application Definition Language (WADL), with significant additions for purposes of providing network security systems.

Figure 8:
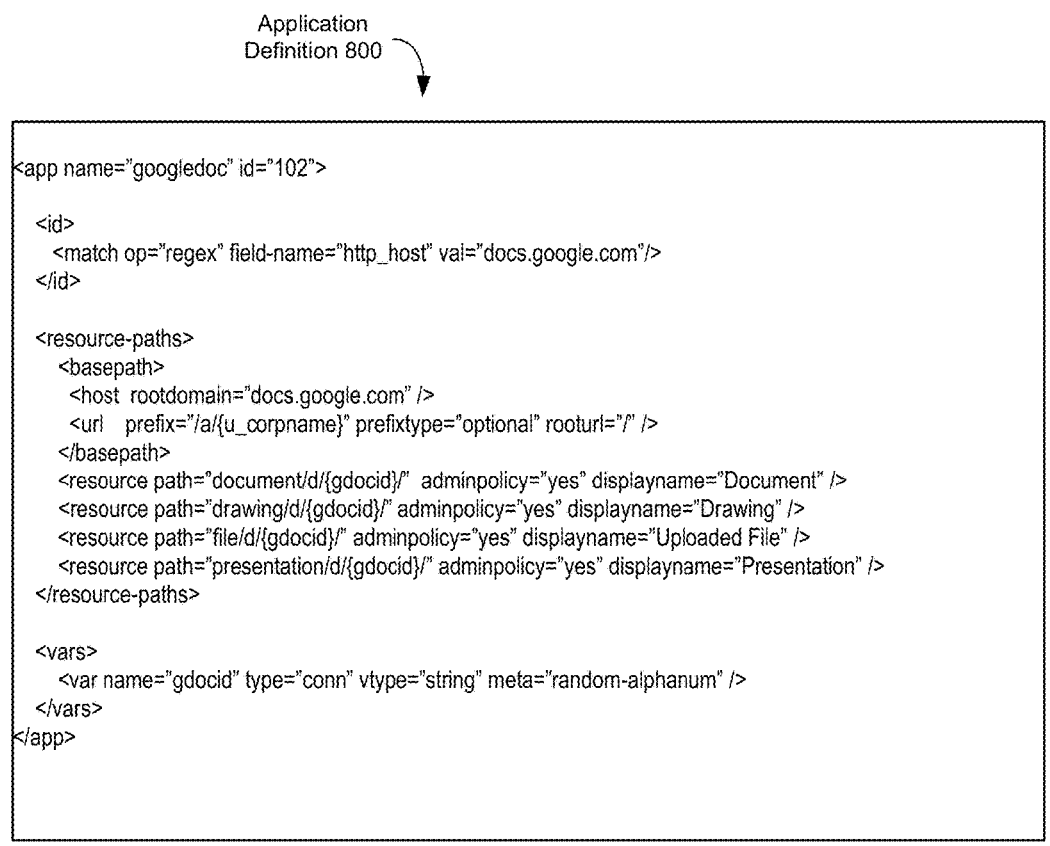

The first example is shown in FIG. 8 and includes application definition 800 for Google Documents. As the short example shows, this is a relatively simple service to define with the identity (<id> XML tags) determined by simple XML matching. Next, resources are defined and an example of how a parameter URL can be parsed and parameters extracted to assign to variables is shown with <basepath> and <resource> XML tags. No triggers are used in this example since the URLs are sufficient for identifying the flow actions of concern, e.g. document access, file upload, etc. Also, in this example a custom variable for the document id is established.

Since the application definitions are defined in a simple XML markup language, they can also be provided by administrators of a corporation. For example, if the corporation has a custom hosted service, they could provide their own application definition.

FIG. 9 with application definition 900 for Dropbox provides an example of defining a more complex hosted service. Here, URLs are insufficient and triggers are added to find the request/response and make determinations. In this example, the custom variable "logine" allocates an application-specific user-persistent variable. The variable has the value type (vtype) of string. The metadata setting is informational only and indicates that it is an "email" address. Lastly the type indicates the persistence—"conn" here, meaning the variable will persist for the connection. As you can see, the login form email address is used to update the user field if later the login is successful, e.g. "<extract>" tag as well as "<find-and-update-user>" tag. In this context, "connection" refers to a high-level non-network construct (e.g. not a TCP/IP connection) but rather a series of multiple related networks requests and responses. Thus, a series of requests and responses over the course of a day could be a single connection within an application, e.g. all use of Salesforce.com within a period without logging off. One definition of a connection is to look at the application session identifier, e.g. cookie or URL parameter, used by the hosted service so that each connection corresponds to a single session identifier.

A typical user interaction with a hosted service like Salesforce.com consists of a sequence of events that occur in the context of a session. The main events of note are: (a) login—provide user credentials to hosted service to authenticate the user; (b) application transactions—execute a set of application level transactions, e.g. add leads or define new campaigns; and (c) log-out—this event terminates the session with the server. In this context an application session connects these interactions for the network security system. Deep packet inspection logic can identify these events and link policy evaluations to each transaction boundary enabling actions to be taken. Most commonly, the application session is identified by a session cookie in the HTTP header. The network security system 120 can use the session cookie to define the session.

The trigger here in this embodiment requires each valid status to be spelled out, e.g. separate match tests are required for 200 status and for 302 status. However, some embodiments may include shortcuts for matching HTTP responses, e.g. "SUCCESS", and/or accept regular expressions for matching, e.g. "200|302".

Having discussed the key condition variables, additional elements of policy enforcement will be considered. This section provides additional details for one embodiment of implementing step 440 of process 400 and step 540 of process 500, discussed supra.

For flow action policies, enforcement points may occur at multiple junctures. For example, a source IP range or country code geolocation enforcement can be applied when the connection is established, but a policy to block specific file uploads to an application would likely only be enforceable when HTTP POST data becomes available when the application identifier and resource identifier condition variables are set. Thus, key points for policy enforcement within the network security system include:

After connection establishment between the client and the network security system;
After HTTP request URL and host received;
After HTTP request header, but before request data (if any) sent;
After HTTP request data received;
After HTTP response header, but before response data sent; and
After HTTP request/response completion (connection may continue in case of pipelining).

Figure 10:
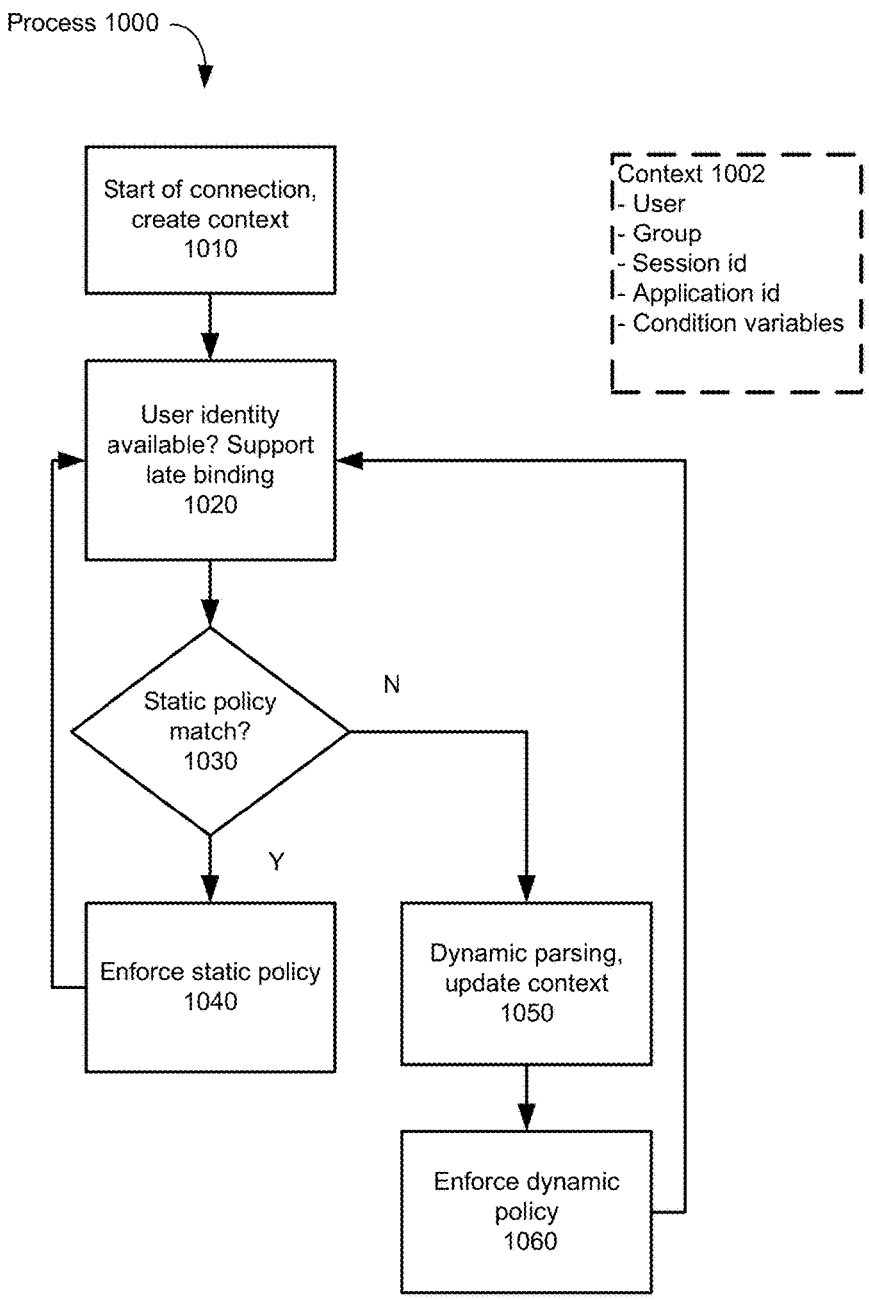
FIG. 10 is a process flow diagram for a more detailed policy filtering process.

Now, we present a more detailed process view of the filtering performed at step 440 or step 540 in conjunction with FIG. 10. In terms of embodiment, FIG. 10 could be carried out by the proxies, e.g. proxy 670, 672, or 674, or the control plane portion of the data plane (not shown) directing the proxies. FIG. 10 includes process 1000, and also context 1002 is shown with dotted lines to emphasize the ongoing dynamic updates of information. The context 1002 includes connection-specific information—note process 1000 is performed separately for each connection. Thus, if a single client device has two connections to the same hosted service simultaneously, each would be handled by a separate instance of process 1000 according to one embodiment.

The list of items in context 1002 is exemplary rather than exhaustive and includes: the user (including late binding resolution based on application behaviors, see account name condition variable supra), group (similarly potentially late binding), a session identifier, an application identifier, and other condition variables. Many of these items are not available initially and are updated or refined as the connection continues.

The process 1000 starts at step 1010 with the connection commencing and the initial context 1002 being established. Next, at step 1020, a determination of whether the full user identity is available is made. Generally, the identity is available, e.g. from the client certificate. But for many hosted services and policies, additional information may be necessary. For this reason, step 1020 is revisited periodically to allow for updated actions based on late binding, e.g. information from subsequent data in the connection.

At step 1030, a determination is made whether any static policies—e.g. policies not requiring deep packet inspection or application-specific triggers (denial) match. A large percentage of policies can be enforced without needing to perform the dynamic analysis. This can reduce the processing needs. For static (denial) matches, the flow continues at step 1040 where the static policy is enforced and the data is not transmitted onward to the hosted service; if appropriate, suitable error messages/responses are transmitted back to the client device. Process flow will continue at step 1020 if additional data arrives for the same connection. Given that the policies are fine-grained and linked to application semantics, e.g. editing/downloading, it is entirely possible that denials can be followed by subsequent allowances.

Returning to step 1030, if none of the static policies matched (for denial), then the flow continues at step 1050 with dynamic analysis of the data packets of the requests/responses within the connection. Multiple packets may need to be consumed to carry out the analysis, e.g. if a policy limits downloads to 100 kilobytes (kB), multiple response packets from the hosted service may need to be received to test the policy. At step 1050, the context 1002 is also updated, see e.g. "<extract>" and "<find-and-update-user>" tags of the application definitions. When a policy (denial) matches, flow continues to step 1060 with the denial enforced, see discussion of step 1040, and flow will continue from step 1060 to step 1020. Additionally, flow will continue from step 1050 to step 1060 if all policy conditions have been tested and the flow is permitted.

The policy enforcement framework is also extensible to allow policy actions to be expanded beyond the described items. In some embodiments, for example, custom policy actions can include selective in-line scanning of data in transition to detect and prevent data leakage. In other embodiments, a policy action can invoke an anti-virus module to scan data in transit for malware and viruses. Still other embodiments, dynamically to perform operations such as selective data encryption or decryption. In one embodiment, the goal can be to ensure that sensitive data uploaded or stored in hosted services is encrypted. Thus encryption can occur on the network security system when data moves from the client to the hosted service and decryption can occur similarly occur on the network security system when data moves from the hosted service to the client. Still other embodiments, may aid with compliance with corporate policies and government regulations, e.g. HIPAA, that require local copies of data to be encrypted. Thus, a download of records, e.g. patients, customers, could be automatically encrypted by a policy triggered by the network security system before it is provided to the requesting client. The encryption (and decryption) keys or passwords can be specified in the policy and/or the third party system. For example, all draft tax returns that are downloaded could be automatically encrypted with the last four characters of a user identifier. In still other embodiments, the encryption system may have a default password for the user that is provided to the network security system. In another embodiment, the encryption is based on a key or password based on the user identity. For example, the password based on the user identity could be a corporate encryption password for a common group of users. In another embodiment, the key could be a common token, e.g. a group certificate.

In another embodiment, encryption could be performed down at the field level. For example, only encrypting social security numbers or credit card number columns in a spreadsheet. Similarly, in another embodiment, the message contents of emails might be encrypted but headers could be left alone.

Data Mining of Event Store and Anomaly Detection

The network security system generates logging information, e.g. raw event data 712, with information gleaned from the data passing through the system. FIG. 11 is an exemplary event log entry including event log entry 1100 in a JSON-style representation. Event log entry 1100 is not exhaustive of the fields that are logged, but rather highlights key fields.

Additionally, event logs from external sources can also be provided to the network security system 120. Mining of the event data can thus accomplish several key tasks:

Establish a baseline usage behavior based on criteria such as: user, user groups, hosted service, hosted service groups, time of day, day of week, geo-location, bandwidth usage, and latency observed. Note the usage behaviors can be tracked per company using the system and/or across companies.

Once the baseline usage behavior is established, anomalous activities are those that do not fit the observed baseline and could be flagged for administrators to review and take action. Example anomalous activities include: user accesses from a geo-locations and/or times that do not fit the baseline and bandwidth usage by a user being very high, e.g. over two standard deviations compared to measured baseline. Notably, the rules are sensitive to roles, e.g. a user in a custom-defined sales group may be afforded greater latitude to be in a non-standard geo-location than an employee outside that group. In some embodiments, some anomalous activities may also be conditions to policies that companies define specific actions, e.g. block for excessive transfer anomaly condition until an administrator approves it.

According to one embodiment, the raw event data 712 is analyzed using machine-learning techniques to establish the baseline. Both supervised (rules based) and unsupervised (clustering) methods can be employed. The baseline data and anomalies can be presented in a human manageable format through the management interface. For example access patterns based on geo-location could be presented using a map interface with points representing users and hosted services and connective arcs showing the usage. According to another embodiment, there is an API available to mine the raw data 712. This API can be used by partners to build value added applications using the data collected by the system. Notably, the anomalies can be tracked across multiple hosted services. For example, a download of data from one service followed by an upload to a second could be an anomaly policy that is automatically detected. Other cross service policies having to do with data integrity and security can similarly be established with suitable conditions.

Conclusion and Additional Embodiments

We describe a system and various embodiments for providing security for network delivered services. As discussed, this provides for a type of virtual network between clients and hosted services with fine-grained filtering and steering linked to user identities and application-level semantics.

Some additional embodiments and features include:

Some embodiments analyze cross-service data flows, e.g. hosted service 1 data flowing to hosted service 2.

Some embodiments apply behavioral analysis on a per-user basis to identify potential intrusions and/or irregular usage.

Some embodiments can identify denial-of-service attacks.

Some embodiments provide service level agreement (SLA) reporting back to corporations as to whether clients were able to use the service as promised by the hosted service.

Some embodiments may be integrated with single sign-on (SSO) vendors/solutions. In some instances, the SSO solution may be used to deny access to hosted services that are not intermediated by the network security system. In one embodiment, the SSO vendor will invoke a "host check" process supported by the network security system 120. The host check starts by the SSO solution redirecting SSO-authenticated users to a "landing page." The landing page is a specific URL hosted, or controlled, by the network security system 120. The landing page contains an HTML element (the challenge element, usually invisible) with a (randomly) generated identifier. The identifier is typically unique for each visit to the landing page to prevent replay attacks. If an add-on is present on the client device, the add-on will detect the HTML element with the identifier and generated a response, e.g. secure hash value of the combination of the challenge element and the add-on user ID. Embedded javascript in the landing page can determine the validity of the response and authorize the access only if the response is validated.

Some embodiments may link user aliases within third-party applications. This can differentiate between a user logged into an application as jsmith@example.com and the same application as jsmith@myisp.com. In such embodiment, a corporate administrator may be able to tell if a particular enterprise user is using more than one accounts to access the same hosted service. This information can be helpful to detect "shadow IT"—use of Internet services in the business context without the support of corporate IT.

In another embodiment, the client traffic can be redirected to the server without using a client agent or browser add-on. For example a DNS CNAME or DNS forwarding rule for the hosted service can resolve to the network security system. In this embodiment, client traffic can be rerouted as follows: (i) using custom hostnames under the entity's control, e.g. hostedservice.companyname.com, that points to the network security system, (ii) customized CNAMES in the hosted service e.g. companyname.hostedservice.com, are configured on the hosting service to point to the network security system instead of the hosting service itself, or (iii) per hosted service DNS forwarding rules for insertion into that company's DNS systems to use the network security system to resolve requests for the hosted service and thus allow redirection. In another embodiment a tunnel (e.g. generic route encapsulation (GRE), IPSec) from the corporate perimeter router/firewall to the network security system is provided. When the traffic is redirected without a client side agent, the user identification can be signaled out of band from the corporate network to the server or the user identity can be extracted from the service login credentials, e.g. jsmith@example.com logging into the hosted service. In another embodiment, authentication system logs can be reviewed to link an IP address to a username for purposes of user identification for a given period of time.

Any data structures and code described or referenced above are stored according to many embodiments on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the invention. Various modifications to the disclosed embodiments will be apparent, and the general principles defined herein may be applied to other embodiments and applications without departing from the spirit and scope of the invention. Thus, the invention is not intended to be limited to the embodiments shown, but is to be accorded the widest scope consistent with the principles and features disclosed herein. The scope of the invention is defined by the appended claims.

What is claimed is:
1. A computer-implemented method, including:
a network security system intercepting communications between clients and application programming interfaces (APIs) of hosted services, the intercepted communications including requests from the clients directed to the APIs and responses from the APIs directed to the clients, semantics for the requests and the responses being defined for the APIs and differing among at least two of the APIs;
in response to the network security system intercepting a particular one of the requests from a client directed to a particular one of the APIs of a hosted service, parsing the particular intercepted request using an application definition which is specific to the semantics defined for the particular API;
based on the parsing, determining an activity being invoked on the hosted service by the particular intercepted request and a context of the activity; and
based on the determined activity and parts of the determined context, enforcing a policy on the particular intercepted request.

2. The computer-implemented method of claim 1, further including:
in response to the network security system intercepting a particular one of the responses from the particular API directed to the client, parsing the particular intercepted response using the application definition;
based on the parsing, further determining the context of the activity; and
based on the determined activity and the determined context, enforcing the policy on the particular intercepted response.

3. The computer-implemented method of claim 1, wherein the activity is upload, download, login, access, edit, create, delete, or logout;
wherein the context includes a name of a user that invoked the activity, a user group of which the user is part of, an account name used by the user to access the hosted service, device and client information about a device and a client used by the user to invoke the activity;
wherein the context includes a name of the hosted service, a hosted service group of which the hosted service is part of, and a resource of the hosted service being requested by the activity and metadata about the requested resource;
wherein the context includes an event triggered by the activity, Internet Protocol (IP) and geolocation information about a connection that includes the particular intercepted request and/or the particular intercepted response, a session linked to the connection, and a response status for the activity;
wherein enforcing the policy further includes performing an action; and
wherein the action is logging, allowing, blocking, dropping, resetting, or encrypting.

4. The computer-implemented method of claim 1, wherein the particular intercepted request includes a requested unified resource locator (URL), a request header, and request data, further including:
performing deep packet inspection of the request data and detecting sensitive data and/or malicious data being transmitted to the hosted service from the client; and
based on the determined activity, the determined context, and the detection of the sensitive data and/or the malicious data, enforcing the policy on the particular intercepted request.

5. The computer-implemented method of claim 2, wherein the particular intercepted response includes a response header and response data, further including:
performing deep packet inspection of the response data and detecting sensitive data and/or malicious data being transmitted to the client from the hosted service; and
based on the determined activity, the determined context, and the detection of the sensitive data and/or the malicious data, enforcing the policy on the particular intercepted response.

6. The computer-implemented method of claim 1, wherein the application definition defines API-specific condition variables that extract values from fields of the particular intercepted request and/or the particular intercepted response based on literal matches, pattern matches, and/or regular expression matches.

7. The computer-implemented method of claim 6, further including:
parsing the requested URL using an application identifier variable of the application definition and extracting parameters of the requested URL;
invoking the application definition based on the extracted parameters; and
wherein the application definition is specific to the semantics defined for a group of APIs of related hosted services, further including parsing respective requested URLs of the related hosted services using the application identifier variable and extracting parameters of the respective requested URLs; and
invoking the application definition based on the extracted parameters.

8. The computer-implemented method of claim 6, further including:
parsing the requested URL using a resource identifier variable of the application definition and extracting parameters of the requested URL; and
based on the extracted parameters, determining the activity, the requested resource, and the metadata about the requested resource.

9. The computer-implemented method of claim 8, wherein the resource identifier variable applies to specific method invocations in the particular intercepted request and/or the particular intercepted response, further including:
parsing specific data types provided by the specific method invocations using the resource identifier variable and extracting values from key-value pairs in the particular intercepted request and/or the particular intercepted response; and
assigning the extracted values to a target variable, wherein the extracted values identify metadata about the activity and the requested resource.

10. The computer-implemented method of claim 1, further including:
parsing the particular intercepted request and/or the particular intercepted response using a custom variable of the application definition and further extracting the metadata about the activity and the requested resource.

11. The computer-implemented method of claim 1, further including:
parsing the particular intercepted request and/or the particular intercepted response using a custom event trigger variable of the application definition and determining an event resulting from the activity;

wherein the event is successful login, failed login, upload, download, access, edit, create, delete, detection of application attack signatures, and detection of confidential information; and responding to the determined event by enforcing a logging policy that logs the determined event and/or a flow step policy that performs the action.

12. The computer-implemented method of claim 1, further including:

parsing the particular intercepted request and/or the particular intercepted response using a user-related variable of the application definition and extracting user information about the user;

wherein the user information includes the user name, the user group, and the account name;

parsing the particular intercepted request and/or the particular intercepted response using a device and client platform variable of the application definition and extracting the device and client information;

wherein the device information includes a device type, a device subtype, an OS family, and an OS subfamily;

wherein the client information includes a browser family;

parsing the particular intercepted request and/or the particular intercepted response using an IP and geolocation variable of the application definition and extracting the IP and geolocation information; and wherein the IP and geolocation information includes a source IP address, a source location, a source region, a source country, a source zipcode, a source latitude, a source longitude, a destination IP address, a destination location, a destination region, a destination country, a destination zipcode, a destination latitude, and a destination longitude.

13. The computer-implemented method of claim 12, further including:

using the account name to identify at least two separate instances of the hosted service;

wherein a first instance is invoked using a general account and a second instance is invoked using a system administrator account; and authorizing determined activities being invoked only on the second instance.

14. The computer-implemented method of claim 1, wherein a data interchange format of the particular intercepted request and/or the particular intercepted response is at least one of JSON and XML, further including parsing the data interchange format using the application definition.

15. The computer-implemented method of claim 1, wherein the condition variables further determine event data including the hosted service group, time of day when the activity was performed, day of week when the activity was performed, bandwidth usage due to the activity, latency observed during the activity, timestamp of when the activity occurred, the name of the hosted service, the requested URL, and an organization of the user.

16. The computer-implemented method of claim 1, further including:

reporting the determined activity, the determined context, the extracted metadata, the determined event, the enforced policy, the performed action, and the determined event data across a web management interface.

17. The computer-implemented method of claim 1, further including:

using the application definition to determine two or more activities being invoked on the hosted service over a series of requests and responses intercepted during the connection and contexts of the respective activities;

wherein the activities include an initial login activity, a set of upload, download, access, edit, or create activities, and a terminal logout activity;

using the custom variable to define a persistence context for the connection;

based on the persistence context, linking the determined activities; and updating the persistence context based on at least one of a session cookie and the extracted parameters.

18. The computer-implemented method of claim 1, further including:

using hundreds of application definitions to determine activities being invoked on the hosted services and contexts of the respective activities.

19. A non-transitory computer readable storage medium impressed with computer program instructions which when executed on a processor implement a method comprising:

a network security system intercepting communications between clients and application programming interfaces (APIs) of hosted services, the intercepted communications including requests from the clients directed to the APIs and responses from the APIs directed to the clients, semantics for the requests and the responses being defined for the APIs and differing among at least two of the APIs;

in response to the network security system intercepting a particular one of the requests from a client directed to a particular one of the APIs of a hosted service, parsing the particular intercepted request using an application definition which is specific to the semantics defined for the particular API;

based on the parsing, determining an activity being invoked on the hosted service by the particular intercepted request and a context of the activity; and based on the determined activity and parts of the determined context, enforcing a policy on the particular intercepted request.

20. A system including one or more processors coupled to memory, the memory loaded with computer instructions which when executed on the processors implement actions comprising:

a network security system intercepting communications between clients and application programming interfaces (APIs) of hosted services, the intercepted communications including requests from the clients directed to the APIs and responses from the APIs directed to the clients, semantics for the requests and the responses being defined for the APIs and differing among at least two of the APIs;

in response to the network security system intercepting a particular one of the requests from a client directed to a particular one of the APIs of a hosted service, parsing the particular intercepted request using an application definition which is specific to the semantics defined for the particular API;

based on the parsing, determining an activity being invoked on the hosted service by the particular intercepted request and a context of the activity; and based on the determined activity and parts of the determined context, enforcing a policy on the particular intercepted request.

* * * * *